US009761148B2

(12) United States Patent
Polansky et al.

(10) Patent No.: US 9,761,148 B2
(45) Date of Patent: Sep. 12, 2017

(54) AIRBORNE SEPARATION ASSURANCE SYSTEM AND REQUIRED TIME OF ARRIVAL FUNCTION COOPERATION

(75) Inventors: Michal Polansky, South Moravia (CZ); Stephane Marche, Toulouse (FR); Mike Jackson, Maple Grove, MN (US); Christine Marie Haissig, Chanhassen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1322 days.

(21) Appl. No.: 12/849,637

(22) Filed: Aug. 3, 2010

(65) Prior Publication Data

US 2012/0035841 A1 Feb. 9, 2012

(51) Int. Cl.
*G05D 1/00* (2006.01)
*G08G 5/00* (2006.01)
*G08G 5/04* (2006.01)

(52) U.S. Cl.
CPC ........... *G08G 5/0078* (2013.01); *G08G 5/045* (2013.01)

(58) Field of Classification Search
CPC .. G08G 5/0039; G08G 5/0069; G08G 5/0078; G08G 5/045
USPC ........................................ 701/120, 3, 66, 465
See application file for complete search history.

(56) References Cited

U.S. PATENT DOCUMENTS 4,099,466 A * 7/1978 Redmond et al. ............ 102/215
4,642,775 A * 2/1987 Cline et al. ................... 701/528
5,121,325 A * 6/1992 DeJonge .............. G05D 1/0005 244/182
6,507,782 B1 * 1/2003 Rumbo ................ G05D 1/0202 244/182
6,542,879 B2 * 4/2003 Biggers et al. ................. 706/24
6,587,757 B2 * 7/2003 Sainthuile ......................... 701/1
6,646,588 B2 11/2003 Tran
6,873,903 B2 * 3/2005 Baiada et al. ................ 701/120
(Continued)

FOREIGN PATENT DOCUMENTS

WO 02099769 A1 12/2002

OTHER PUBLICATIONS

Hoffman, E. et al.; Airbome Spacing: Managed vs. Selected Speed Mode on the Flight Deck, American Institute of Aeronautics and Astronautics.

(Continued)

*Primary Examiner* — Minnah Seoh
*Assistant Examiner* — Teresa Williams
(74) *Attorney, Agent, or Firm* — Lorenz & Kopf, LLP

(57) ABSTRACT

Methods and systems are provided for enhancing the functionality of an airborne separation assurance system (ASAS) by modifying it to cooperate with a required time of arrival (RTA) functionality. The system comprises an autopilot configured to execute a trajectory of an aircraft and a flight management system (FMS) in operable communication with the autopilot. The FMS includes a required time of arrival (RTA) system that is configured to determine an RTA aircraft trajectory of the aircraft based on a required time of arrival of the aircraft at a waypoint along the flight plan. The system also includes an airborne separation assurance system (ASAS) in operable communication with the RTA and is configured to determine a spacing trajectory based on a spacing interval from a first reference aircraft.

8 Claims, 5 Drawing Sheets

(56) References Cited

U.S. PATENT DOCUMENTS

| | | | | |
|---|---|---|---|---|
| 6,885,340 | B2 * | 4/2005 | Smith et al. | 342/465 |
| 7,257,487 | B2 | 8/2007 | Tran | |
| 7,412,324 | B1 | 8/2008 | Bagge et al. | |
| 7,437,225 | B1 * | 10/2008 | Rathinam | G08G 5/0013 340/961 |
| 7,492,307 | B2 | 2/2009 | Coulmeau | |
| 7,877,197 | B2 * | 1/2011 | Lewis et al. | 701/120 |
| 8,010,267 | B2 * | 8/2011 | Klooster et al. | 701/66 |
| 8,027,783 | B2 * | 9/2011 | Closse et al. | 701/120 |
| 8,078,341 | B2 * | 12/2011 | Gutierrez-Castaneda | 701/3 |
| 8,244,466 | B2 * | 8/2012 | DeJonge et al. | 701/465 |
| 8,983,760 | B2 * | 3/2015 | McDonald | G08G 5/0039 340/945 |
| 2002/0011950 | A1 | 1/2002 | Frazier et al. | |
| 2003/0093219 | A1 | 5/2003 | Schultz et al. | |
| 2004/0078136 | A1 * | 4/2004 | Cornell et al. | 701/120 |
| 2005/0035898 | A1 * | 2/2005 | Shiomi et al. | 342/36 |
| 2007/0200731 | A1 * | 8/2007 | Winkler | G01C 23/005 340/961 |
| 2007/0219679 | A1 * | 9/2007 | Coulmeau | G08G 5/0039 701/3 |
| 2008/0103646 | A1 | 5/2008 | Lucas et al. | |
| 2008/0103647 | A1 | 5/2008 | Lucas et al. | |
| 2008/0300738 | A1 | 12/2008 | Coulmeau et al. | |
| 2009/0043434 | A1 * | 2/2009 | Deker | 701/16 |
| 2009/0125221 | A1 * | 5/2009 | Estkowski et al. | 701/120 |
| 2009/0177342 | A1 * | 7/2009 | Gutierrez-Castaneda | G08G 5/0039 701/11 |
| 2009/0259351 | A1 | 10/2009 | Wachenheim et al. | |
| 2009/0259392 | A1 | 10/2009 | Berard et al. | |
| 2009/0319101 | A1 | 12/2009 | Coulmeau | |
| 2010/0004800 | A1 | 1/2010 | Zammit-Mangion et al. | |
| 2010/0131124 | A1 * | 5/2010 | Klooster | G08G 5/0052 701/3 |
| 2010/0217510 | A1 * | 8/2010 | Deker | G08G 5/045 701/120 |
| 2010/0241345 | A1 * | 9/2010 | Cornell | G08G 5/0013 701/120 |
| 2011/0270472 | A1 * | 11/2011 | Shafaat | G08G 5/0008 701/4 |

OTHER PUBLICATIONS

Hoffman, E. et al.; Analysis of Spacing Guidance for Sequencing Aircraft on Merging Trajectories, 21st Digital Avionics Systems Conference, Irvine, CA, Oct. 2002.

EP Search Report, EP 11175405.7-2215 dated Nov. 21, 2011.

EP Communication, EP 11175405.7-2215 dated Dec. 2, 2011.

* cited by examiner

300

AIRBORNE SEPARATION ASSURANCE SYSTEM AND REQUIRED TIME OF ARRIVAL FUNCTION COOPERATION

TECHNICAL FIELD

The present invention generally relates to systems and methods to ease the burden of air traffic control (ATC) in high density areas, and more particularly relates to systems and methods by which onboard Airborne Separation Assurance Systems (ASAS) and Required Time of Arrival (RTA) systems may cooperate to maintain aircraft separation and spacing in high density areas.

BACKGROUND

The ever increasing amount of air traffic has caused a marked increased in the workload of ATC controllers in high traffic density areas around airports. The Next Generation (NextGen) overhaul of the United States airspace system and the companion Single European Sky ATM Research (SESAR) overhaul of the European airspace system are proposing various trajectory-based mechanisms to ease the pressures on the air traffic management on those continents. Some solutions being suggested include the increased use of onboard Required Time of Arrival (RTA) systems and Airborne Separation Assurance Systems (ASAS) that allow an aircrew limited control of aircraft spacing and separation in areas where ATC personnel face heavy work loads.

ASAS is an onboard system that enables the flight crew to maintain a spacing interval or separation of their aircraft from one or more reference aircraft, and provides flight information concerning surrounding traffic. The ASAS receives traffic information from nearby aircraft using an Automatic Dependence Surveillance-Broadcast (ADS-B) system, an Automatic Dependent Surveillance-Rebroadcast (ADS-R) system or from a ground station using a Traffic Information System-Broadcast (TIS-B). ASAS interval spacing allows the aircrew to achieve and maintain a given spacing with respect to one or more particular reference aircraft. The ATC can either retain the responsibility for aircraft separation in regard to other aircraft or delegate the responsibility. Such systems are useful in dense traffic areas such as the area surrounding an airfield or in oceanic environments where ATC applies procedural separation.

A flight management system (FMS) is an onboard system that may include RTA capability. This RTA capability allows an aircraft to "self-deliver" to a specified waypoint or waypoints of a flight plan at a specified time along a four-dimensional trajectory (latitude, longitude, altitude and time). The RTA system may be used within the context of a Controlled Time of Arrival system to help manage the burden on an ATC system resource. Additional information concerning the use of RTA systems in the cruise phase of a flight plan may be found in *Impacts of ATC Related Maneuvers on Meeting a Required Time of Arrival*, Paul Oswald, The MITRE Corporation, Egg Harbor, N.J. (2006) and in U.S. Pat. No. 6,507,782, which are hereby incorporated by reference in their entireties.

However, RTA and ASAS systems are self-contained and do not work together. Under the current state of the art, an ASAS system output can conflict with the operation of the RTA system causing frequent and unnecessary flight plan changes which is detrimental to the efficient operation of an aircraft and overtaxes ATC assets.

Accordingly, it is desirable to develop a system that permits an ASAS system to work together with RTA functionality. In addition, it is desirable to enhance the functionality of both the ASAS and RTA systems. Furthermore, other desirable features and characteristics of the present invention will become apparent from the subsequent detailed description of the invention and the appended claims, taken in conjunction with the accompanying drawings and this background of the invention.

BRIEF SUMMARY

A system is provided for self-controlling air traffic traversing a flight plan. The system includes an autopilot that is configured to execute a trajectory of an aircraft and a required time of arrival (RTA) system that is in operable communication with the autopilot and is configured to determine an RTA aircraft trajectory of the aircraft based on a required time of arrival of the aircraft at a waypoint along the flight plan. The system further comprises an airborne separation assurance system (ASAS) that is in operable communication with the RTA and is configured to determine a spacing trajectory based on a spacing interval from a first reference aircraft.

A method is provided for self-controlling an aircraft. The method includes executing a required time of arrival (RTA) trajectory by an autopilot that was compiled by a processor and is based at least in part on a required time of arrival at a waypoint of a flight plan of the aircraft and compiling a spacing trajectory based at least upon a diverter to a first reference aircraft. The method also includes determining if the spacing interval to the first reference aircraft will be violated while executing the RTA trajectory. If the RTA trajectory will not violate the spacing interval requirement, then continuing to execute the RTA trajectory. If the RTA trajectory will violate the spacing interval requirement, then a new RTA trajectory is compiled that incorporates at least part of the first spacing trajectory and executing the new RTA trajectory.

A method is provided for self-controlling an aircraft. The method includes executing a required time of arrival (RTA) trajectory by an autopilot that was compiled by a processor based at least on at required time of arrival at a waypoint of a flight plan of an aircraft and compiling a spacing trajectory based at least in part upon a spacing interval requirement. The method also includes determining if the RTA trajectory has not actually violated the spacing interval requirement then continuing the RTA trajectory. If the minimum RTA trajectory has actually violated the spacing interval requirement, then executing the spacing trajectory.

BRIEF DESCRIPTION OF THE DRAWINGS

The present invention will hereinafter be described in conjunction with the following drawing figures, wherein like numerals denote like elements.

DETAILED DESCRIPTION

Figure 1:
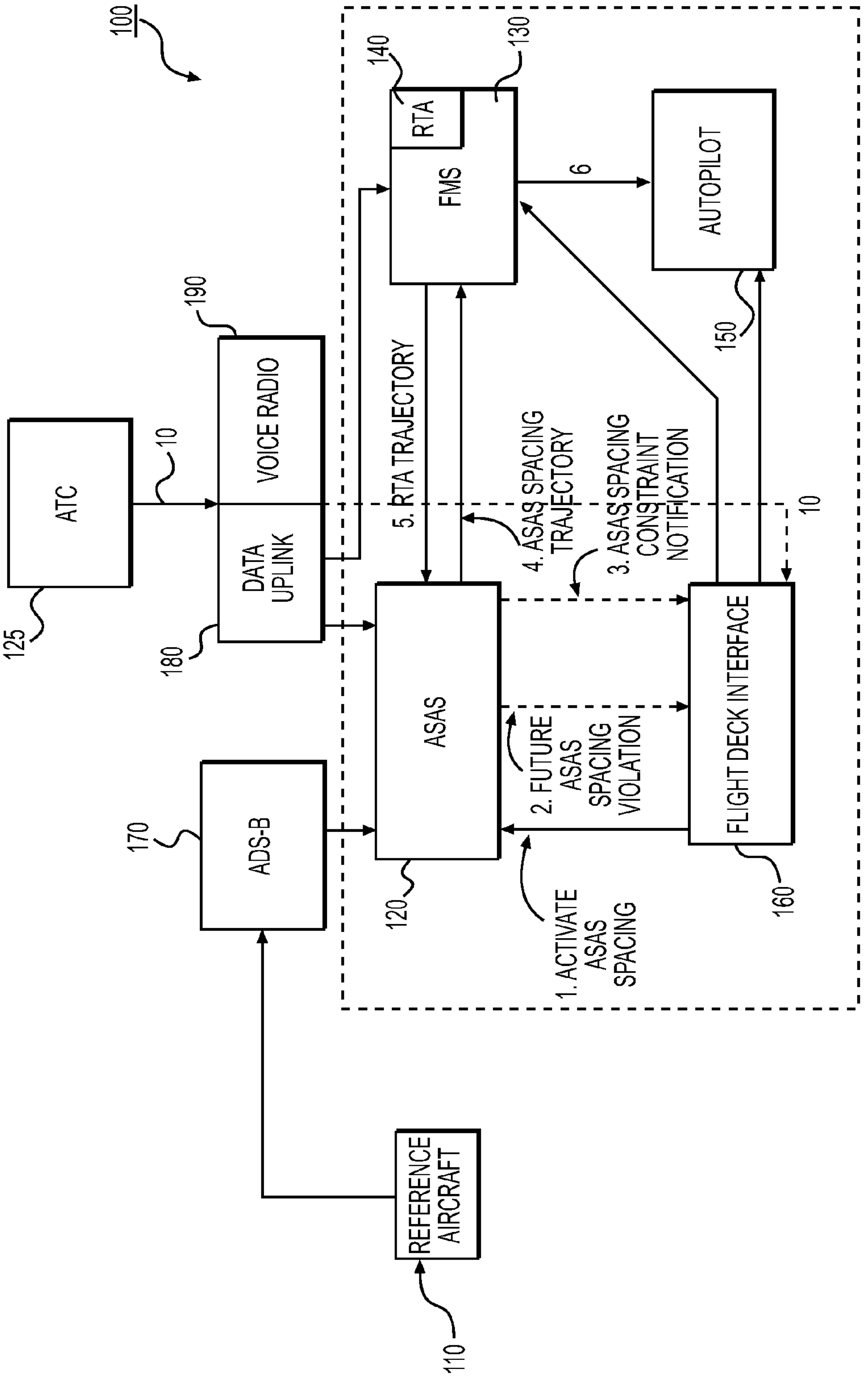
FIG. 1 is a functional block diagram of a system enabling anticipatory ASAS spacing operating in cooperation with meeting RTA requirements.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments of the subject matter disclosed herein may be described in terms of functional block components, optional selections and various method steps. It will be appreciated by those of ordinary skill in the art that such functional components may be implemented using any number of hardware, firmware and software sub-components that are configured to perform specific functions. For example, the various block components may employ memory elements, computer readable storage elements, processing elements, logic elements, look-up tables, display devices, communications devices, and the like that may carry out a variety functions under the control of one or more processors or under other control devices. Non-limiting examples of suitable computer readable storage media may include magnetic disks, CD-ROM, optical storage devices, RAM, EPROM, FLASH, EEPROM, and the like.

Processors may include any suitable type of processors known in the art or that may be developed in the future. Some non-limiting examples of processors may include a general purpose processor, a special purpose processor, a dual-processor, a programmable logic device, a field programmable gate array, a co-processor and the like.

Software elements may be implemented using any suitable programming or scripting language that is known in the art or that may be developed in the future. Some non-limiting examples of programming languages include Fortran, C, C++, Java, XML, COBOL, assembler, PERL, Basic, Matlab or the like with various algorithms being implemented with any suitable combination of data structures, software objects, processes, steps, routines or other programming elements. Further, it will also be appreciated that the various embodiments herein may employ any number of suitable techniques for data transmission, signaling, data processing, network control, and the like.

The subject matter disclosed herein allows an aircraft to self-control or self-deliver itself along a specified flight path in high density traffic areas, such as an approach to an airfield, by combining ASAS functionality with RTA functionality. This self-control or self-delivery reduces the demands on an ATC authority because the ATC does not have to continuously relay maneuvering directions to the pilot.

FIG. 1 illustrates an exemplary embodiment of a system 100 enabling anticipatory ASAS spacing with RTA cooperation. By "anticipatory" ASAS spacing, it is meant that while executing an RTA trajectory, the onboard ASAS system 120 monitors nearby reference aircraft 110 to determine if a minimum diverter requirement from any of those contacts will be violated in the future while executing the RTA trajectory. A diverter as used herein may be a spacing interval requirement, minimum distance requirement, a maximum distance requirement, a distance range requirement, or a time requirement. Similarly, a spacing interval requirement as used herein may be minimum distance requirement, a maximum distance requirement, a distance range requirement, or a time requirement.

As the aircraft approaches an airfield or other airspace of concern, the traffic density may be relatively light at some distance from the airfield. Because of the light traffic density, it may be more efficient for an aircraft to control its autopilot 150 using the RTA functionality of its FMS 130.

The FMS 130 calculates maneuvering directions 6 for the aircraft autopilot 150 (or the pilot) based on the current location and altitude of the aircraft relative to a specific waypoint along its flight plan and an RTA at that waypoint. At least some of these maneuvering directions 6 are determined by the RTA system 140 based upon the RTA included in the aircraft's flight plan. The RTA 140 is a computing device configured to build a computerized profile of a flight plan of an aircraft in the vertical, lateral and temporal dimensions.

Although depicted in FIG. 1 as being integrated into the FMS 130, the RTA system 140 may be a standalone component in operable communication with the FMS 130. One of ordinary skill in the art will appreciate that the RTA system 140 may be incorporated into any suitable cockpit component as a sub-component or as a software module without departing from the scope of the disclosure herein.

As the aircraft nears the airfield, more aircraft will come into close proximity to the pilot's aircraft. These other aircraft will be referred to herein as reference aircraft 110. In close proximity, aircraft separation takes priority over a required time of arrival for safety reasons. Aircraft separation may be monitored and a corrective trajectory determined by the ASAS 120 which may receive its traffic data from a surveillance system such as ADS-B 170. The ADS-B system 170 is a well known onboard surveillance system whereby aircraft periodically broadcast their position and velocity vector to other nearby aircraft. However, those skilled in the art that other surveillance systems such as ADS-R and TIS-B may also provide traffic position and velocity data.

The term "trajectory" as used herein refers to a full four-dimensional representation of an aircraft path, and typically takes the form of a series of waypoints comprising a flight plan and the courses, speeds and turn points required to reach each waypoint along the flight plan. The term "trajectory" may also refer to a subset of the full four-dimensional information, such as a speed profile, change in speed profile or the addition/subtraction of waypoints.

The ASAS 120 tracks the position of the other reference aircraft 110 and compiles an own ship trajectory to maintain station on one particular reference aircraft based on stationing instructions 10 received from an ATC 125. In some embodiments, it is preferred that the one particular reference aircraft 110 is the reference aircraft that has a projected range that is closest to the trajectory of the aircraft in time and distance. Stationing instructions 10 may be received automatically over a data uplink 180 or received verbally over a voice radio 190 and then manually keyed into the ASAS via a flight deck interface 160. In some embodiments, the ADS-B 170 may be incorporated into the ASAS 120.

The flight deck interface may be any type of suitable interface device. Non-limiting examples of a flight deck interface may include a mouse, a keyboard and a display unit. The display unit may comprise a physical display device with multiple physical input transducers and multiple physical display panels for interfacing with the flight crew.

Exemplary, non-limiting transducers may include push buttons, switches, knobs, touch pads and the like. Exemplary, non-limiting display panels 204 may include light emitting diode arrays, liquid crystal displays, cathode ray tubes, incandescent lamps, etc. The flight deck interface 160 may communicate with any number of cockpit devices such as the FMS 130, and the auto pilot 150 the data uplink 180.

One of ordinary skill in the art will appreciate that the anticipatory ASAS capability need not always be enabled during flight. The anticipatory ASAS capability may be enabled manually by the flight crew, remotely by the ATC, or may be automatically enabled based on some objective criteria such as determining the number of nearby contacts, or reaching a certain point along a flight plan. As a non-limiting example, FIG. 1 depicts an enablement signal 1 being transmitted manually from the Flight Deck Interface 160 to the ASAS 120.

Figure 2:
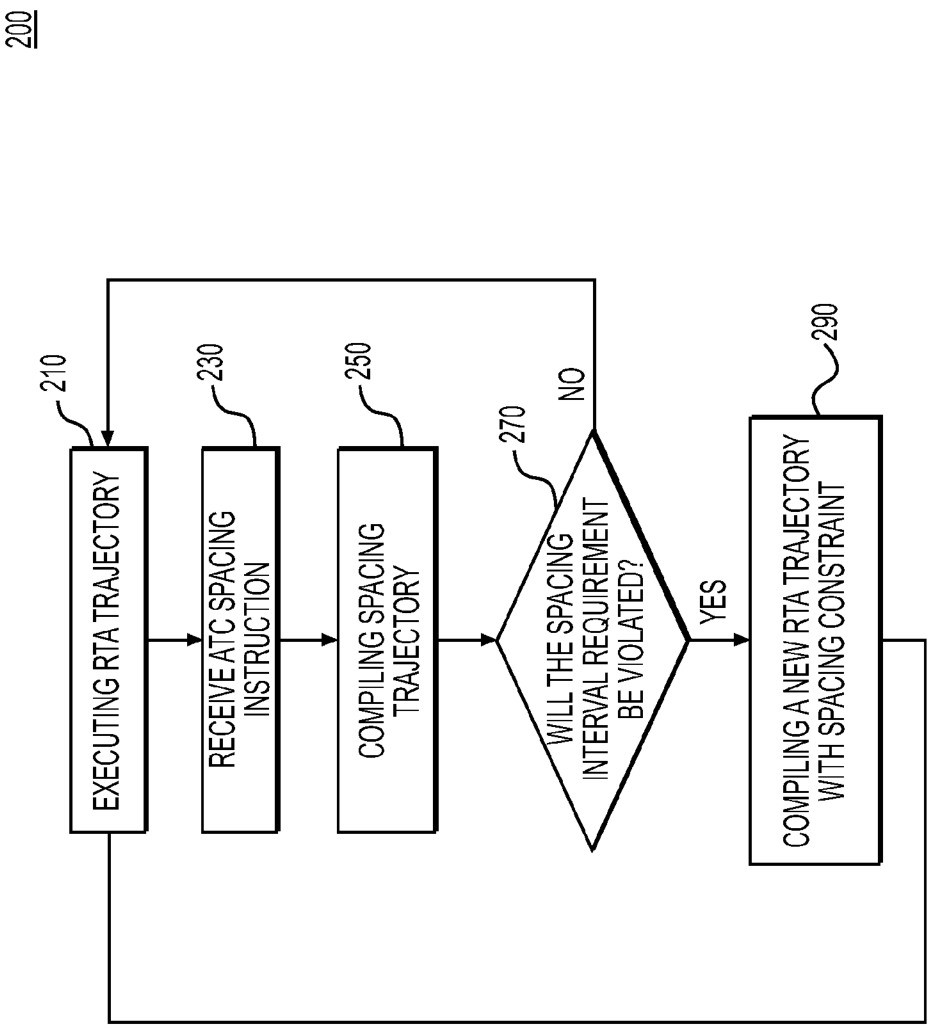
FIG. 2 is an exemplary method of operation of the system of FIG. 1.

FIG. 2 is a logic flow diagram of an exemplary method for integrating ASAS and RTA functionality in an anticipatory mode. It will be appreciated by one of ordinary skill in the art that the steps of a method may be consolidated, the steps may be subdivided into component steps, optional steps may be added and steps may be rearranged without departing from the scope or disclosure of the subject matter disclosed herein.

At process 210, an RTA trajectory is determined by the RTA system 140 based at least upon a specific RTA at a specific waypoint. The RTA trajectory is then executed by the autopilot 150 or by the pilot. The RTA trajectory may be a change in speed, a change in direction or both.

At process 230, the stationing instruction 10 is received either automatically via the data uplink 180 or via the voice radio 190. If received via voice radio 190, the pilot inputs the stationing instruction 10 into Flight Deck Interface 160. The stationing instruction 10 contains stationing information in reference to a nearby reference aircraft 110 designated as a stationing guide. Typically, this information will comprise a diverter requirement to a station trailing the reference aircraft 110 and a time or location by which the spacing needs to be achieved. Although the diverter requirement is usually in a trailing position behind the reference aircraft 110, the subject matter disclosed herein is not intended to be so limited. However, for the sake of simplicity and clarity of explanation, the stationing information will be assumed herein after to concern a trailing position to the reference aircraft 110.

At process 250, the ASAS 120 receives the stationing information and compiles an ASAS spacing trajectory 4 for its own ship that would place its own ship in the trailing position required by the stationing instruction 10. The term "compile" or "recompile" as used herein is intended in the broad sense of the word as in assembling, collecting or calculating and is not intended to be restricted to the meaning of "compiling" as used in the art of computer programming.

At process 270, the ASAS 120 determines whether or not the RTA trajectory 5 being executed will anticipatorily violate the spacing interval requirement as own ship approaches the next waypoint. This determination may be made by any suitable computing device. Non-limiting examples of computing devices that may make this determination may include the RTA system 140, the ASAS 120, the FMS 130 or the autopilot 150. The determination may also be made by another processor or other computing device aboard the aircraft without departing from the scope or spirit of the subject matter disclosed herein such as a ADS-B, TCAS or other collision avoidance system.

If the RTA trajectory 5 will not violate the spacing interval requirement at process 270, then the RTA trajectory continues to be executed at process 210. If the RTA trajectory 5 will violate the spacing interval requirement, then a new RTA trajectory is compiled by the RTA/FMS system 140/230 that incorporates the constraints of the ASAS spacing trajectory 4 from the ASAS 120. The spacing interval constraints may also include a new waypoint determined by the ASAS120 if a change in course is needed before arriving at the designated spacing interval.

In compiling the new ASAS/RTA trajectory 5, the RTA system 140 attempts to adjust speed and/or course to meet the spacing interval requirement and the RTA. However, it will be appreciated that the RTA becomes subordinate to the spacing instruction. The RTA may be sacrificed if the RTA cannot be met within predefined parameters that may be set by the aircraft operator and still maintain the spacing interval requirement.

Figure 3:
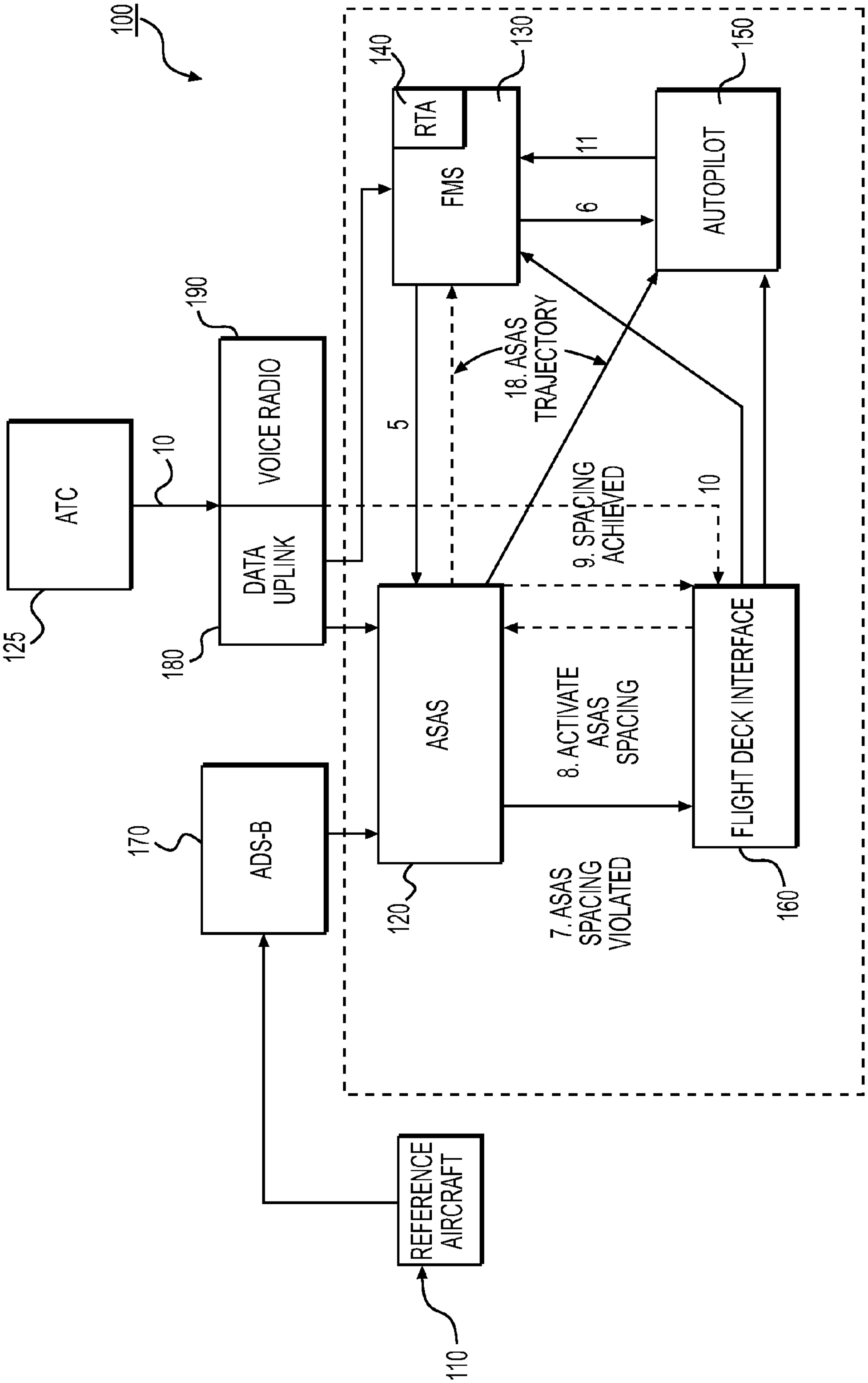
FIG. 3 is a functional block diagram of a system enabling real time ASAS spacing operating in cooperation with meeting RTA requirements.

FIG. 3 illustrates an exemplary embodiment of a system 100 enabling real time ASAS spacing with RTA cooperation. By "real time" ASAS spacing, it is meant that while executing an RTA trajectory, the onboard ASAS system 120 monitors nearby reference traffic 110 to determine if a spacing interval requirement from any of the reference traffic contacts has in fact been violated while executing the RTA trajectory.

FIG. 3 illustrates all of the same components as discussed above in regard to FIG. 1. However, in some embodiments the ASAS 120 may be configured to directly provide the ASAS trajectory information 18 to the autopilot 150, bypassing the FMS 130. However, the FMS may also receive the AAS trajectory information as well.

One of ordinary skill in the art will appreciate that the real time ASAS capability need not always be enabled during flight. The real time ASAS capability may be enabled 8 manually by the flight crew, remotely by the ATC, or automatically based on some objective criteria such as the number of nearby contacts or at a certain point along a flight plan. As a non-limiting example, FIG. 3 depicts an enablement signal 8 being transmitted from the Flight Deck Interface to the ASAS 120 upon detecting that the spacing interval requirement has been violated.

Figure 4:
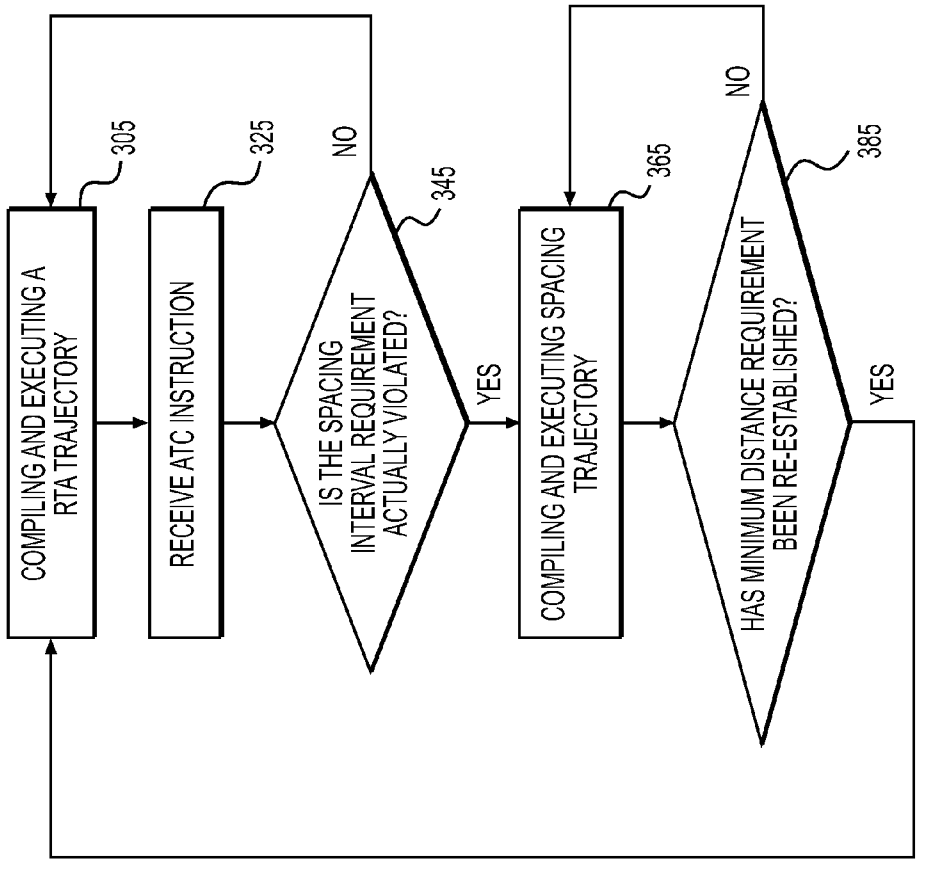
FIG. 4 an exemplary method of operation of the system of FIG. 1.

FIG. 4 is a logic flow diagram of an exemplary method for incorporating ASAS functionality in a real time mode. It will be appreciated by one of ordinary skill in the art that the steps of a method may be consolidated, the steps may be subdivided into component steps, optional steps may be added and steps may be rearranged without departing from the scope or disclosure of the subject matter disclosed herein.

At process 305, the RTA trajectory 5 (see, FIG. 2, 3) is determined by the RTA system 140 based at least upon an RTA at a waypoint. The RTA trajectory 5 is executed by the autopilot 150 or the pilot.

At process 325, the spacing instruction 10 is received either automatically via the data uplink 180 or via voice radio 190. If received via voice radio 190, the pilot manually inputs the spacing instruction 10 into Flight Deck Interface 160. The ATC instruction contains stationing information concerning a nearby reference aircraft 110. Typically, this information will comprise the spacing interval trailing the reference aircraft 110.

At process 345, it is determined whether or not the spacing interval requirement has been violated. Although this violation is described herein as being determined by the ASAS 120, one of ordinary skill in the art will appreciate that such infringement may be determined by other systems.

As non-limiting examples such violations may be determined by a collision avoidance system or the ADS-B system 170.

If the spacing interval requirement is not being violated, then the RTA trajectory 5 is continued at process 305. If the spacing interval requirement is being violated, then the ASAS 120 compiles and executes an ASAS spacing trajectory 18 required to re-establish the spacing interval requirement and transmits the spacing trajectory directly to the autopilot 150 at process 365. However, in alternative embodiments, the ASAS 120 may transmit the spacing trajectory 18 to the FMS 130 at process 365. The FMS 130 would then in turn drive the auto pilot 150.

At process 385 it is determined if the ASAS spacing trajectory 18 has re-established the spacing interval requirement. If so, the RTA system 140 compiles and executes a RTA trajectory 5 based upon the then present geographic location. If not, then the ASAS 120 compiles a new ASAS spacing trajectory 18 for execution.

It should be noted that so long as the spacing interval requirement is not violated, the ASAS 120 is not required to generate a spacing trajectory. Only when there is an actual violation of the spacing interval requirement does the ASAS 120 provide a spacing trajectory for execution by the autopilot 150. However, this should not be construed as the ASAS 120 not being enabled, active or generating ASAS spacing trajectories 18 based on the spacing interval requirement, but that an ASAS spacing trajectory is not provided to the autopilot 150 for execution.

Figure 5:
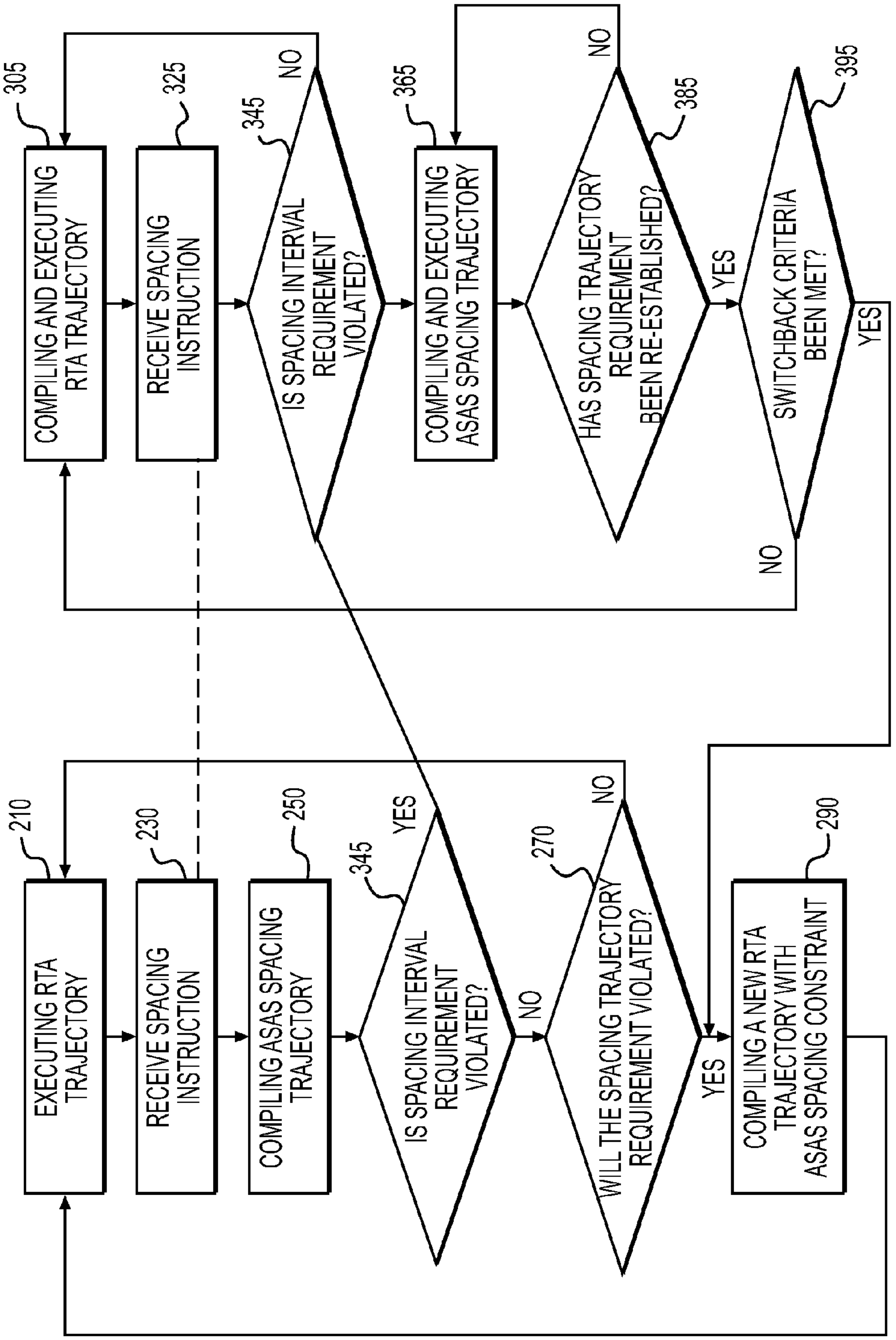
FIG. 5 is an exemplary method of operation of the system of FIG. 1 that allows the conditional switching between the methods of FIG. 3 and FIG. 4.

FIG. 5 illustrates an embodiment allowing for the conditional switching between the anticipatory method illustrated in FIG. 2 and the real time method illustrated in FIG. 4. As such, the anticipatory method and the real time method may run in parallel or one or the other may be started under certain circumstances. The left hand side of FIG. 5 presents substantially the same logic processes of the anticipatory method of FIG. 2 with the exception that processes 325 and 345 occur in both methods. Therefore, assuming that the anticipatory method of FIG. 2 is active, after the ASA spacing trajectory 18 is compiled at process 250, it is determined if the spacing interval requirement has actually been violated. If the spacing interval requirement has not been violated then method proceeds to process 290 as disclosed above in regard to discussion of FIG. 2.

If the spacing interval requirement has been violated then the logic steps associated with the real time method of FIG. 3 are executed. Because the ASAS trajectory compiled at process 250 may be different than the ASAS trajectory calculated at process 365, the ASAS trajectory calculated at process 365 is transmitted to the autopilot 150 for execution.

Once switched to the real time method in the right hand column, the real time method is continued until certain switchback criteria are determined to have been met at process 395. If the switchback criteria have been met then the anticipatory method is executed beginning at process 290.

The switchback criteria may be any suitable criteria. Non-limiting examples of suitable switchback criteria may include the number of local air contacts, distance to the runway, time spacing, distance to the reference aircraft 110, the spacing interval requirement, etc.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An onboard system for self-controlling an aircraft traversing a flight plan, comprising:

a required time of arrival (RTA) system configured to compile an RTA trajectory based at least upon an RTA at a waypoint of a flight plan of the aircraft and to;

an autopilot in operable communication with the RTA system, the autopilot configured to execute the RTA trajectory that was compiled by the RTA system;

an airborne separation assurance system (ASAS) in operable communication with the RTA and the autopilot and configured to compile a spacing trajectory based at least in part on a spacing interval requirement and determine if the RTA trajectory actually violated the spacing interval requirement, wherein:

when the RTA trajectory has not actually violated the spacing interval requirement then the autopilot continues to execute the RTA trajectory, when the RTA trajectory has actually violated the spacing interval requirement, then the autopilot executes the spacing trajectory, the ASAS is further configured to determine if the spacing interval requirement has been re-established by executing the spacing trajectory, and when the spacing trajectory has re-established the spacing interval requirement, then RTA system is further configured to determine a new RTA trajectory to the waypoint and supply the new RTA trajectory to the autopilot for execution thereby.

2. The onboard system of claim 1, wherein the ASAS builds the spacing trajectory based at least in part on a communication from an air traffic control authority containing a spacing interval requirement.

3. The onboard system of claim 1, further comprising a flight deck interface device in operable communication with the ASAS configured to visually provide maneuvering data to a pilot in regard to either the spacing trajectory, the RTA trajectory or both the spacing trajectory and the RTA trajectory.

4. A method for self-controlling an aircraft, comprising the steps of:

executing a required time of arrival (RTA) trajectory by an autopilot that was compiled by a processor based at least upon a required time of arrival at a waypoint of a flight plan of an aircraft;

compiling a spacing trajectory by an airborne separation assurance system based at least in part upon a spacing interval requirement;

determining if the RTA trajectory actually violated the spacing interval requirement;

when the RTA trajectory has not actually violated the spacing interval requirement then continuing the RTA trajectory;

when the RTA trajectory has actually violated the spacing interval requirement, then executing the spacing trajectory;

determining if the spacing interval requirement has been re-established by executing the spacing trajectory; and when the spacing trajectory has re-established the spacing interval requirement, then determining and executing a new RTA trajectory to the waypoint.

5. The method of claim 4, wherein the spacing interval requirement is received from an air traffic control authority via one of a data uplink communication and a voice communication.

6. The method of claim 4, further comprising:

determining if the spacing trajectory has reestablished the spacing interval requirement;

when the spacing trajectory has not actually reestablished the spacing interval requirement, then continue executing the spacing trajectory, otherwise determining a first new RTA trajectory and executing the new RTA trajectory.

7. The method of claim 6, further comprising updating and recompiling the spacing trajectory if the spacing trajectory.

8. The method of claim 6, further comprising:

determining if a set of switchback criteria have been satisfied;

when the set of switchback criteria has not been satisfied, then determining and executing the first new RTA trajectory; and when the set of switchback criteria has been met, then determining and executing a second new RTA trajectory.

* * * * *